March 14, 1967 R. A. NONWEILER 3,309,439
METHOD OF PRODUCING AN EXPANDED POLYSTYRENE FOAM
HAVING A DENSE SURFACE
Filed Nov. 6, 1964

INVENTOR.
RICHARD A. NONWEILER
BY
MORSELL & MORSELL
Attorneys

United States Patent Office 3,309,439
Patented Mar. 14, 1967

3,309,439
METHOD OF PRODUCING AN EXPANDED POLYSTYRENE FOAM HAVING A DENSE SURFACE
Richard A. Nonweiler, Oshkosh, Wis., assignor to Lakeside Plastics Corporation, Oshkosh, Wis., a corporation of Wisconsin
Filed Nov. 6, 1964, Ser. No. 409,545
5 Claims. (Cl. 264—45)

This invention relates to improvements in methods of producing coated expanded polystyrene foam.

This application is a continuation-in-part of my copending application Ser. No. 331,802, filed Dec. 19, 1963, and now abandoned.

Heretofore, various types of articles have been made by the molding of expandable polystyrene beads, usually by first pre-expanding the beads, then charging the preexpanded beads into a mold, and then subjecting the mold to heat to cause further expansion and fusion of the beads in the mold. Polystyrene foam articles are used widely in packaging where strength consistent with lightness is desired, where insulation qualities are important, or where buoyancy is a desired characteristic.

The main drawbacks of present commercial foamed polystyrenes are their susceptability to denting or scratching and their limited resistance to attack by solvents or heat. It has heretofore been attempted to subsequently apply a coating, either in the form of an emulsion or a solvent, to the outside of the foamed article. The application of such coatings, however, involves a separate process and increases the expense of production. Furthermore, the coatings are necessarily quite thin. It has also been attempted to surface heat the finished article to melt down the surface for a predetermined distance inwardly and thus form a coating. This technique limits the surface coating to polystyrene, which has limited resistance to solvents and heat.

Another known coating method is that described by Jacob Frank in U.S. Patent 2,950,505. The Frank method involves depositing a nonexpandable thermoplastic resin on the walls of a heated mold, filling the interior of the mold with expandable particles, and heating the mold to form fused articles having an integral skin. This method is obviously cumbersome and involves high labor costs.

I have discovered a novel method of molding a composition that can be used directly to provide an improved expanded polystyrene foam having a relatively thick integral protective coating that is formed simultaneously with the process of molding the expandable polystyrene beads.

It is, therefore, an object of the invention to provide an improved method of manufacturing an expanded polystyrene foam article wherein the major portion by volume of the article is formed of expanded polystyrene foam, but wherein there is an integral fused surface layer of a synthetic unexpandable thermoplastic material.

A further object of the invention is to provide an improved method of forming an integral skin on an expanded polystyrene foam article simultaneously with the molding of the foam.

In accordance with the invention there is provided a free-flowing molding composition comprising expandable polystyrene beads, 0.33–3 parts by weight, per part beads, of a nonexpandable thermoplastic resin powder and 3–40 percent by weight, based on the weight of the beads of retained water in the form of a hydrate containing at least 25 percent by weight chemically bound water. Molded expanded articles having an integral skin are made by charging the molding composition into a casting mold having heat conducting walls and moving the mold in a source of heat to cause movement of the denser nonexpandable thermoplastic resin to a position against the mold walls and fusion thereagainst in the form of an external coating, while the less dense expandable polystyrene beads remain in the interior of the mold cross-section. The chemically bound moisture of the uniformly distributed hydrate is released to create steam throughout the mold cavity and to aid in transferring heat to the beads to cause expansion and fusion to each other and to the nonexpandable resinous skin.

In the accompanying drawing illustrating a preferred embodiment of the invention in which the same reference numerals designate the same parts in all of the views.

Figure 1:
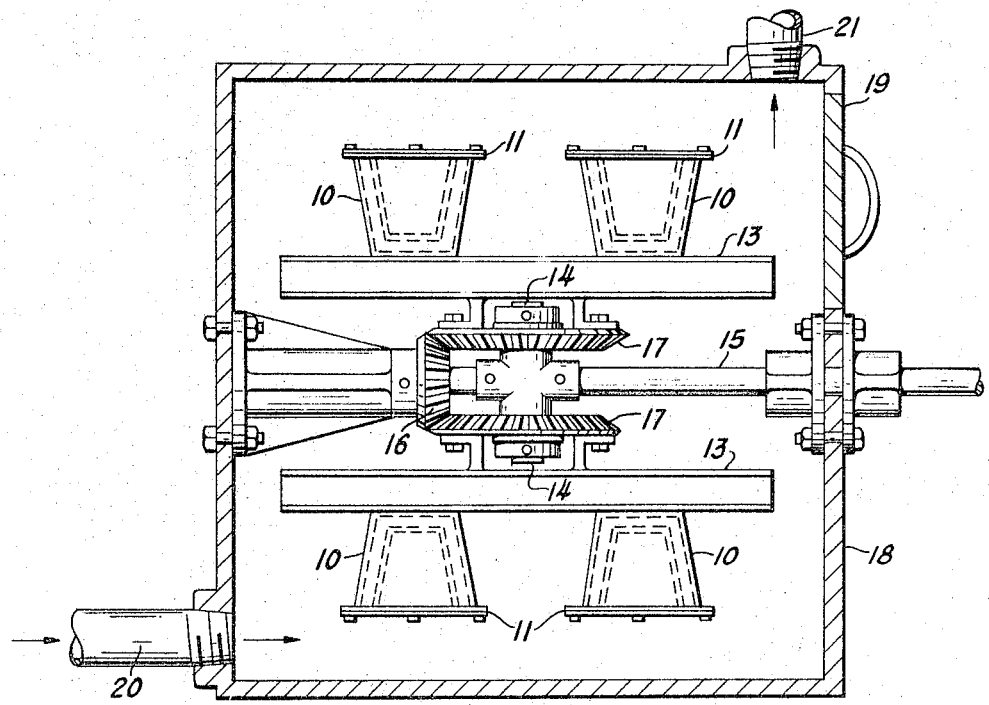
FIG. 1 is a partially diagrammatic vertical sectional view through a molding oven illustrating one method of supporting the molds for multi-directional rotation while they are being heated.

The ingredients of the composition can be blended in any desired manner. It is sometimes convenient to form a premix of the nonexpandable synthetic thermoplastic resin and the hydrate and thereafter blend in the expandable polystyrene beads.

Expandable polystyrene is commercially available in bead or pellet form in sizes ranging between 10 and 80 mesh, conveniently 20–40 mesh (U.S. sieves). The beads or pellets are rendered expandable by the incorporation therein of a volatile organic blowing agent having a boiling point at atmospheric pressure ranging between about −10 and +100° C. The particles that have attained the widest commercial acceptance contain a normally liquid aliphatic hydrocarbon blowing agent, such as pentane, petroleum ether, hexane, and the like, and are made by the process described in U.S. Patent 2,983,-692 of Gaetano F. D'Alelio. The polystyrene particles are preferably used in unexpanded condition. Although discrete partially expanded beads made by a pre-expansion step, such as described in Rodman, U.S. Patent 3,023,175, are operable as an ingredient in the molding composition, pre-expansion is not necessary or particularly desirable. The novel molding process works better with unexpanded beads and the cost of the pre-expansion, together with the equipment cost, is eliminated.

The nonexpandable resin is used in powdered form, the individual particles being 10–325 mesh, preferably 20–100 mesh (U.S. sieves), in size. Thus, useful nonexpandable thermoplastic resins include polyethylene; polyethylene copolymers, such as ethylene-ethyl acrylate copolymers and ethylene-vinyl acetate copolymers; high-melting micro waxes; vinyl plastisols; polyvinyl chloride; polyvinyl acetates; copolymers of vinyl acetate and vinyl chloride; cellulose acetate; cellulose acetate butyrate; cellulose acetate propynate; polystyrene; copolymers of styrene and such monomers as butadiene, alpha-methylstyrene, isobutylene and acrylonitrile; phenol-aldehyde, resorcinol-aldehyde and urea aldehyde resins; polyamides, polyacrylates, such as polymethyl-methacrylate; polyurethanes; polycarbonates; and the like.

In formulating the novel molding composition, the polystyrene beads are blended with 0.33–3 parts by weight, per part beads, of the nonexpandable thermoplastic resin powder. If less than 0.33 part by weight nonexpandable resin powder is used, the resulting molded article has an insufficient thermoplastic skin surface. If more than three parts by weight nonexpandable resin is used, the product has an insufficient expanded polystyrene core and the coating becomes unnecessarily thick. Best results are obtained using 0.67–1.5 parts by weight, per part beads, of the nonexpandable resin powder.

In addition to the expandable polystyrene and nonexpandable thermoplastic resin, the molding composition of the invention must contain retained water in an amount ranging between about 3 and 40 percent by weight, based on the weight of the beads, in the form of a hydrate. The hydrate serves to distribute moisture uniformly throughout the plastic mix while the mix retains the generic characteristics of a substantially dry, free-flowing powder. To be effective, the hydrate must contain at least 25 percent by weight chemically bound water and may, in the case of certain organic gels, contain up to 90 percent by weight bound water. Unbound water cannot effectively be uniformly distributed and is not retained by the composition for a useful period of time. The use of hydrates containing less than 25 percent bound water results in poor molding and a finished article having insufficient skin surface with poor foam polystyrene fusion. As noted above, the hydrate must be present in an amount sufficient to provide a retained water content ranging between about 3 and 40 percent by weight. If less than 3 percent water in the form of a hydrate is used, the fusion is poor and the skin surface of the molded article is often insufficient. If more than 40 percent by weight water in the form of a hydrate is used, the free-flowing quality of the product is adversely affected. Best results are obtained using a hydrate in an amount sufficient to provide 10-15 percent by weight, based on the weight of the beads, of bound water. The following hydrates are especially useful in making the molding compositions of the invention, the number given in parentheses representing the amount of chemically bound water present in the particular hydrate: sodium-potassium tartrate (25%), cupric sulfate (36%), ferrous sulfate (45%), aluminum ammonium sulfate (47%), sodium tetraborate (47%), magnesium sulfate (51%), sodium sulfate (55%), trisodium phosphate (56%), sodium silicate (60%), sodium carbonate (63%), hydroxyethyl cellulose gel (ca. 90%), methyl cellulose gel (ca. 90%), carboxymethyl cellulose gel (ca. 90%), and the like.

Often, the use of hydrates containing relatively large amounts of chemically bound water (ca. greater than 50%) causes the molding composition to become excessively damp and thus is detrimental to the necessary free-flowing characteristics. This is particularly true when such materials as sodium silicate and the organic gels are used as the hydrate. To offset the dampening effect of excessive amounts of bound water in the formulation, there can be optionally added a small quantity; i.e., up to 20 percent by weight, based on the weight of the beads, of an inert drying substance. The particular drying material selected varies with the choice of hydrate. For instance, with the inorganic hydrates, such as sodium or potassium silicate, excellent results are obtained using baking soda (sodium bicarbonate). If the organic cellulosic gels are used as the hydrate, highly absorbent inert substances, such as dehydrated or treated calcium carbonate or diatomaceous earth, are particularly effective. These materials are also useful in combination with inorganic hydrates. The specific quantity of inert drying material used varies with the amount of hydrate present and the amount of chemically bound water present in the particular hydrate. Generally, up to 10 percent drying material is sufficient to offset the excess amount of bound water and provide a substantially dry free-flowing molding composition. If the amount of drying material required is in the range of 10-20 percent, there is a slight tendency of the material to leach out through the skin of the molded article, which is detrimental to the physical appearance of the article. The use of more than 20 percent drying material is undesirable because of excessive leaching.

To produce colored articles according to the invention, there may be optionally added from 0.2-2 percent by weight, based on the weight of the beads, of an organic or inorganic pigment. Other inert materials, such as vermiculite and powdered metals, may be added to produce unusual skin effects.

Figures 2, 3:
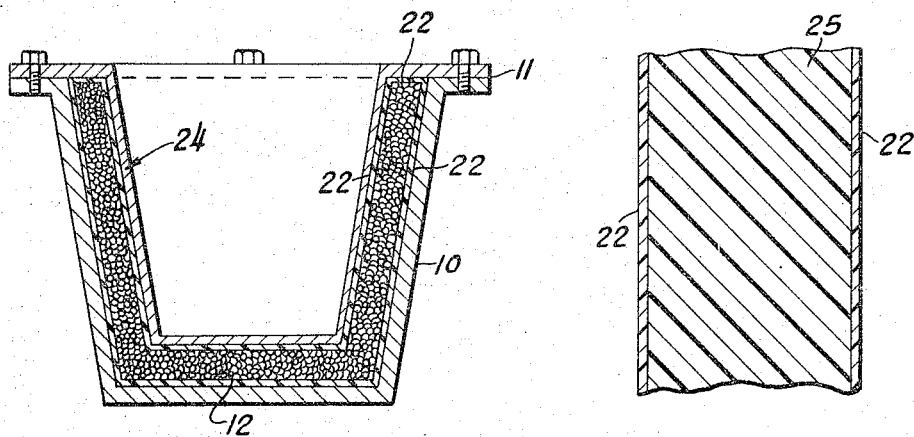
FIG. 2 is a cross-sectional view through a mold with the partially completed coated and expanded article therein.
FIG. 3 is an enlarged cross-sectional view of a wall of a completed article.

In the process of the invention, the molding composition is charged into a suitable mold, such as the molds 10 of FIGURES 1 and 2. These molds may be of any desired shape, depending upon the article to be molded, but are free of undercuts and are formed of suitable metal having good heat conducting qualities. Suitable mold materials are cast aluminum, electro-formed copper and nickel, formed sheet steel, or formed sheet aluminum. As an example, a steel mold as shown in FIG. 1, having an outside wall of 12 gauge steel and an inner wall of 16 gauge steel, would work well in a temperature of 550° F., with 5½ minutes molding time with the apparatus rotated at 8 r.p.m. on the horizontal axis and 2 r.p.m. on the other axis.

Molds for use in the invention are of the imperforate type and thus differ from the ordinary perforate or vented closed molds used for molding expandable polystyrene. Vents or perforations are unnecessary because the introduction of steam or gases is unnecessary; the steam required for heat distribution is generated from within the composition by the release of bound water from the hydrate, and, in effect, is introduced into the mold before it is closed. In any case, the nonexpandable thermoplastic resin fuses against the external walls at an early stage of the molding operation and thereafter prevents the escape of gases from the interior of the mold cavity. Furthermore, perforations in the mold are undesirable, because they become plugged with nonexpandable resin, cause irregularities in the skin of the molded product, and interfere with discharge of the molded article from the mold.

The molds may be in two parts, separable along a parting line 11, to permit charging of the mix therein. Covering of a predetermined portion of the depth of the cavity 12 of the lower mold section is usually ample for an article of the type shown in FIG. 2. After the molds have been charged and closed, they are suitably secured to the racks 13 of a suitable casting machine. In carrying out the present method, it is important that the molds be moved sufficiently to cause the desired action to take place while the molds are being subjected to the action of heat. This is best accomplished by a rotational casting machine or by a centrifugal casting machine. One such machine is illustrated in FIG. 1, wherein the racks 13 are suitably mounted for rotation around the axis of the studs 14 and also around the axis of the shaft 15. Thus, the apparatus provides for rotation in two planes at right angles to each other. In the apparatus of FIG. 1 the shaft 15 may be suitably driven to act through the bevel gear 16 meshing with bevel gear 17 to cause rotation of the mold-holding racks 13 in opposite directions around the axis of the studs 14. At the same time, the arrangement is such that the racks are also rotating around the axis of the shaft 15. One such mechanism is disclosed in the Delacoste Patent No. 2,624,072, and other apparatus for imparting a suitable motion is disclosed in Bailey Patent No. 2,824,986 and Miller Patent No. 2,784,454. An example of a centrifugal casting machine is shown in Bola Patent No. 2,811,747.

The apparatus of FIG. 1 shows the mold rotating mechanism operable within a chamber 18 having a suitable door 19, there being suitable means within the chamber for subjecting the molds to heat. In one method, hot air from a suitable source may be admitted, preferably under pressure, at 20 to charge the container 18 with heated air and thereby cause heating of the molds as they are being rotated, there being an outlet 21 for the heating medium. The rotational casting is performed at a temperature of between 225° and 750° F., preferably between 300 and 600° F.

As the molds 10 are rotated, the denser nonexpandable thermoplastic material, such as the polyethylene, together with a suitable pigment if one is being used, absorbs heat at a faster rate and gravitates to the outside against the wall of the mold, as shown at 22, FIG. 2, while the expanding polystyrene beads, being less dense, stay in between as at 23. In addition, the unexpandable thermoplastic resin, which preferably has a lower melting point, fuses at a relatively early stage of the process against the external walls, as at 22, with the still expanding beads in the interior, as at 23. At a later stage, the polystyrene beads fuse together between the external coatings 22. Due to the fact that the molding composition contains a hydrate, such as water-glass or borax, the bound moisture therein is released and turns to steam within the mold cavity to transfer heat uniformly to the expanding beads, the steam flowing in between all of the beads to distribute the heat effectively throughout the latter. As the beads expand, they become insulators, but the steam that has been generated in the mold cavity from the water-glass, or the like, continues to transmit heat uniformly to the beads while they are expanding. The molding is continued until the expansion of the beads has been continued for a sufficient length of time to create a satisfactory foamed wall and to fuse the skin to the surface of the foam. This period of time for molding may be anywhere between two and fifteen minutes, depending upon the wall thickness of the product, the source of heat, and the nature of the mold section. The temperature within the chamber 18 may vary within the range of 225–750° F., depending upon wall thickness, desired handling time and other factors.

The density of the finished product can be controlled by the relative amount of expandable polystyrene beads in the molding composition charged into the mold. The density may be anywhere between two pounds per cubic foot and 20 pounds per cubic foot. The density of the final product may also be varied by changing the type of nonexpandable thermoplastic resin used in the preparation of the molding composition.

After the molding has been completed, the door 19 of the chamber 18 may be opened and the molds removed, whereupon the molds are separated to remove the cast products, such as the open-topped container 24 shown in FIG. 2. It will be found that in the finished product, of which a section is shown in FIG. 3, all of the fused-together foamed beads will occupy the interior as at 25 (FIG. 3) and there will be integral exterior coatings 22, either plain or colored, depending upon whether or not pigment is added to the formulation. This coating will be formed of the nonexpandable thermoplastic material of the molding composition and will provide excellent surface integrity. It will minimize the possibility of denting or scratching, and such coatings are resistant to heat and to certain solvents which might attack an uncoated polystyrene foam article.

The molded articles are very desirable for use in picnic chests, ice pails, and other insulated containers, and in marine items such as fishnet floats, ring buoys, or other articles where flotation qualities are desired.

Various changes and modifications may be made without departing from the spirit of the invention, and all of such changes are contemplated as may come within the scope of the claims.

My invention is further illustrated by the following examples:

Example I

A molding composition was prepared by blending 125 g. of expandable polystyrene beads, ranging in size between 16 and 40 mesh (U.S. sieves) and containing 5.3 percent by weight pentane as a blowing agent, 125 g. of a polyethylene homopolymer powder having a mesh size of from 30–200 mesh, 12 percent by weight water, based on the weight of the beads, in the form of sodium silicate (60 percent chemically bound water), and 6.6 percent by weight, based on the weight of the beads, of sodium bicarbonate.

The composition was charged to a rotational molding machine having a single-cavity, cast aluminum mold. The mold was manually operated, closed and inserted into the molding machine and thereafter into the water immersion cooling tank. The mold had a 3/16 inch inner wall thickness and a 5/16 inch outer wall thickness. Molding was done at a six minute contact time at an air temperature of 590° F. and a rotation of 9½ r.p.m. The molded article was completely submerged in the cooling water for one minute and twenty seconds. The resulting product was a container 12″ x 6¾″ x 3¼″ with a ¾ inch wall thickness. The molded container had a uniform skin surface and excellent fusion of the expanded polystyrene beads both to each other and to the polyethylene skin.

Example II

The procedure of Example I was repeated with the exception that the molding composition consisted of only expandable polystyrene beads and polyethylene powder. The composition was a dry, free-flowing powder, but it gave a poor molding with a poor foam polystyrene fusion. The addition of free water to the composition gave an acceptable immediate molding, but it lacked the excellent fusion of the product of Example I. Delayed molding was poor with poor foam polystyrene fusion.

TABLE I

| Example No. | Formulation | Results |
| --- | --- | --- |
| III | Beads plus polyethylene plus 12% water in the form of calcium sulfate ($CaSO_4 \cdot 2H_2O$) containing 21% chemically bound water. | Dry, free-flowing powder; poor molding with insufficient skin surface and poor foamed polystyrene fusion. |
| IV | Beads plus polyethylene plus 12% water in the form of sodium-potassium tartrate ($NaKC_4H_4O_6 \cdot 4H_2O$) containing 25% chemically bound water. | Dry, free-flowing powder; excellent molding with uniform skin surface. Slight leaching of salt to the skin surface. |
| V | Beads plus polyethylene plus 12% water in the form of cupric sulfate ($CuSO_4 \cdot 5H_2O$) containing 36% chemically bound water. | Dry, free-flowing powder; good molding with uniform skin surface, slightly less foamed polystyrene fusion than Ex. I. Marked blue coloration of surface. |
| VI | Beads plus polyethylene plus 12% water in the form of ferrous sulfate ($FeSO_4 \cdot 7H_2O$) containing 45% chemically bound water. | Dry, free-flowing powder; good molding with uniform skin surface, slightly less foamed polystyrene fusion than Ex. I. Slight leaching of salt to the skin surface. Marked reddish-brown coloration of the surface. |
| VII | Beads plus polyethylene plus 12% water in the form of aluminum ammonium sulfate [$Al_2(SO_4)_3 \cdot (NH_4)_2SO_4 \cdot 24H_2O$], containing 47% chemically bound water. | Dry, free-flowing powder; fair molding with uniform skin surface but fair foamed polystyrene fusion. |
| VIII | Beads plus polyethylene plus 12% water in the form of sodium borate (borax) ($Na_2B_4O_7 \cdot 10H_2O$) containing 47% chemically bound water. | Dry, free-flowing powder; excellent molding with uniform skin surface, excellent fusion. |
| IX | Beads plus polyethylene plus 12% water in the form of magnesium sulfate ($MgSO_4 \cdot 7H_2O$) containing 51% chemically bound water. | Dry, free-flowing powder; excellent molding with uniform skin surface. |
| X | Beads plus polyethylene plus 12% water in the form of sodium sulfate ($Na_2SO_4 \cdot 1PH_2O$) containing 55% chemically bound water. | Dry, free-flowing powder; good molding with uniform skin surface, slightly less foamed polystyrene fusion than Ex. I. |
| XI | Beads plus polyethylene plus 12% water in the form of sodium phosphate ($Na_3PO_4 \cdot 12H_2O$) containing 56% chemically bound water. | Same as Example X. |
| XII | Beads plus polyethylene plus 12% water in the form of sodium carbonate ($Na_2CO_3 \cdot 10H_2O$) containing 63% chemically bound water. | Same as Example X. |

Examples III–XII

A series of moldings were made according to the procedure of Example I to determine the effectiveness of hydrates containing varying amounts of chemically bound water. In each formulation there was used 125 g. of expandable polystyrene and 125 g. of polyethylene powder.

The results of Table I show that the hydrate must contain at least 25 percent by weight chemically bound water.

Examples XIII–XXIII

A series of moldings were made to determine the amount of retained water that must be furnished by the hydrate in the molding composition. In each formulation there was used 125 g. of expandable polystyrene and 125 g. of polyethylene powder. The results are shown in the following table.

TABLE II

| Example No. | Formulation | Results |
|---|---|---|
| XIII | Beads plus polyethylene plus 24% water in the form of sodium borate (borax). | Dry, free-flowing powder; excellent molding with uniform skin surface, excellent fusion. |
| XIV | Beads plus polyethylene plus 6% water in the form of sodium borate (borax). | Same as Example XIII. |
| XV | Beads plus polyethylene plus 3% water in the form of sodium borate (borax). | Same as Example XIII. |
| XVI | Beads plus polyethylene plus 2% water in the form of sodium silicate. | Dry, free-flowing powder; poor molding with uniform skin surface, but poor foamed polystyrene fusion. |
| XVII | Beads plus polyethylene plus 4% water in the form of sodium silicate. | Dry, free-flowing powder; marginal molding with uniform skin surface. Fair foamed polystyrene fusion. |
| XVIII | Beads plus polyethylene plus 8% water in the form of sodium silicate. | Damp, free-flowing powder; good molding with uniform skin surface, slightly less foamed polystyrene fusion than Ex. I. |
| XIX | Beads plus polyethylene plus 12% water in the form of sodium silicate. | Same as Ex. I except damp, free-flowing powder and slight leaching of salt to the skin surface. |
| XX | Beads plus polyethylene plus 18% water in the form of sodium silicate plus 9.9% sodium bicarbonate. | Damp, non-free-flowing powder until sodium bicarbonate addition then dry, free-flowing. Good molding with uniform skin surface. Very slight leaching of salt to the skin surface. |
| XXI | Beads plus polyethylene plus 24% water in the form of sodium silicate plus 13.2% sodium bicarbonate. | Same as Ex. XX except slight leaching of salt to the skin surface. |
| XXII | Beads plus polyethylene plus 36% water in the form of sodium silicate plus 19.8% sodium bicarbonate. | Same as Example XXI. |
| XXIII | Beads plus polyethylene plus 42% water in the form of sodium silicate plus 23.1% sodium bicarbonate. | Same as Example XX except excessive leaching of salt to the skin surface. |

It is seen from the above examples that at least 3 percent and not more than 40 percent retained water is required to produce a good molded article.

Examples XXIV–XXVII

The procedure of Example I was repeated, except that the relative proportions of polystyrene beads and polyethylene powder were varied as indicated below.

TABLE III

| Example No. | Formulation | Results |
|---|---|---|
| XXIV | Beads plus polyethylene in a 20/80 mixture. | Dry, free-flowing powder; poor molding, uniform skin surface but insufficient foamed polystyrene. |
| XXV | Beads plus polyethylene in a 40/60 mixture. | Dry, free-flowing powder; good molding with uniform skin surface, slightly less foamed polystyrene fusion than Ex. I. |
| XXVI | Beads plus polyethylene in a 60/40 mixture. | Same as Example I. |
| XXVII | Beads plus polyethylene in a 80/20 mixture. | Dry, free-flowing powder; excellent foamed polystyrene but poor molding and insufficient polyethylene skin surface. |

It is seen from the above examples that more than 0.25 and less than 4 weight parts resin per part beads must be present in the mix.

Example XXVIII

The procedure of Example I was repeated using varying air temperatures of 250, 700 and 750° F. At the lower temperatures, there was obtained good to excellent moldings with a uniform skin surface. At 750° F., there was some distortion of the foam polystyrene.

Examples XXIX–XXXII

Excellent molded articles were made according to the procedure of Example I from compositions formed by blending polystyrene beads in the relative amounts indicated below with a premix formed by blending the thermoplastic resin, the hydrate, drying agent and coloring pigment as desired.

(XXIX)

40 parts pre-mix: Parts
  Ethylene-ethyl/acrylate copolymer _____ 77.7
  Water glass (60% retained water) _____ 15.5
  Baking soda _____ 5.2
  Water _____ 0.8
  Yellow coloring pigment _____ 0.8
60 parts expandable polystyrene beads between 10 and 20 mesh (U.S. sieves).

(XXX)

40 parts pre-mix:
  Vinyl acetate copolymer of polyethlyene ____ 88
  Water combined with 2 parts carboxymethyl cellulose _____ 10
60 parts yellow colored expandable beads.

(XXXI)

40 parts pre-mix:
  Vinylacetate/polyethylene copolymer _____ 9
  Cellulose acetate butyrate powder _____ 75
  Water combined with 2 parts hydroxyethyl cellulose _____ 10
  Red coloring pigment _____ 1
  Calcium carbonate filler _____ 3
60 parts expandable beads.

(XXXII)

50 parts pre-mix:
  Crystal polystyrene powder _____ 80
  Water glass (60% retained water) _____ 15
  Baking soda _____ 5
50 parts expandable polystyrene beads.

Equally good results are obtained by substituting in the above formulations other thermoplastic resins, such as high impact polystyrene, phenol-formaldhyde molding powder, methyl acrylate molding powder, polyvinyl chloride molding powder and polypropylene.

I claim:
1. A method of manufacturing an expanded polystyrene foam product comprising:

charging a free-flowing molding composition into a casting mold having heat-conducting walls, with said composition comprising:
  expandable polystyrene beads,
    0.33–3 parts by weight, per part beads, of a non-expandable thermoplastic resin powder, and
    3–40 percent by weight, based on the weight of beads, of retained water in the form of a hydrate containing at least 25 percent by weight chemically bound water,
  moving the mold in a source of heat to cause movement of the denser non-expandable thermoplastic resin to a position against the mold walls and fusion thereagainst in the form of an external coating while causing expansion of the polystyrene beads and fusion of the latter together and to said coating.

2. A method of manufacturing an expanded polystyrene foam product comprising:
  charging a dry, free-flowing molding composition into a casting mold having heat-conducting walls, said composition comprising:
    expandable polystyrene beads,
    0.67–1.5 parts by weight, per part beads, of a powdered ethylene polymer,
    10–15 percent, based on the weight of beads, of retained water in the form of hydrated sodium slicate, and
    up to 10 percent, based on the weight of beads, of sodium bicarbonate,
  moving the mold in a source of heat to cause movement of the denser non-expandable thermoplastic resin to a position against the mold walls and fusing thereagainst in the form of external coatings while the water released from the hydrate is converted to steam to cause expansion of the polystyrene beads and fusion of the latter together and to said coatings in a position between the coatings.

3. A method of manufacturing an expanded polystyrene foam product comprising:
  charging a dry, free-flowing molding composition into a casting mold having heat conducting walls, said molding composition comprising:
    expandable polystyrene beads,
    0.67–1.5 parts by weight, per part beads, of a powdered ethylene polymer, and
    10–15 percent, based on the weight of beads of retained water in the form of hydrated sodium tetraborate,
  moving the mold in a source of heat to cause movement of the denser non-expandable thermoplastic resin to a position against the mold walls and fusing thereagainst in the form of external coatings while the water released from the hydrate is converted to steam to cause expansion of the polystyrene beads and fusion of the latter together and to said coatings in a position between the coatings.

4. A method of manufacturing an expanded polystyrene foam product comprising:
  charging a free-flowing molding composition into a casting mold having heat-conducting walls, said molding composition comprising:
    expandable polystyrene beads,
    0.33–3 parts by weight, per part beads, of a non-expandable thermoplastic resin powder, and
    3–40 percent by weight, based on the weight of beads, retained water in the form of a hydrate containing 25–90 percent by weight chemically bound water,
  rotating the mold in a source of heat around two axes simultaneously to cause movement of the denser non-expandable thermoplastic resin to a position against the mold walls and fusing thereagainst in the form of external coatings while the water released from the hydrate is converted to steam to cause expansion of the polystyrene beads and fusion of the latter together and to said coatings in a position between the coatings.

5. A method of manufacturing an expanded polystyrene foam product comprising:
  charging a free-flowing molding composition into a rotational casting mold having heat-conducting walls, said molding composition comprising:
    expandable polystyrene beads,
    0.33–3 parts by weight, per part beads, of a non-expandable thermoplastic resin powder, and
    3–40 percent by weight, based on the weight of beads, retained water in the form of a hydrate containing 25–90 percent by weight chemically bound water,
  rotating the mold in a source of heat around two axes simultaneously to cause movement of the denser non-expandable thermoplastic resin to a position against the mold walls and fusing thereagainst in the form of external coatings while the water released from the hydrate is converted to steam to cause expansion of the polystyrene beads and fusion of the latter together and to said coatings in a position between the coatings.

References Cited by the Examiner

UNITED STATES PATENTS

| | | | |
|---|---|---|---|
| 2,755,291 | 5/1956 | Stastny et. al. | 264—53 |
| 2,907,075 | 10/1959 | Newby | 264—53 XR |
| 2,911,382 | 11/1959 | Barkhuff et al. | 260—2.5 |
| 2,950,505 | 8/1960 | Frank | 264—45 |
| 2,958,907 | 11/1960 | Mumford et al. | 264—45 |
| 2,986,535 | 5/1961 | Jacobson | 260—2.5 |
| 3,060,513 | 10/1962 | Klink et al. | 264—26 |
| 3,072,581 | 1/1963 | Platzer | 260—2.5 |
| 3,079,630 | 3/1963 | Orr | 264—51 |
| 3,155,753 | 11/1964 | Weissman et al. | 264—45 |

FOREIGN PATENTS 903,564  8/1962  Great Britain.

OTHER REFERENCES

Koppers booklet: "Dylite-expandable-polystyrene," © 1954, page 19.

ALEXANDER H. BRODMERKEL, *Primary Examiner.*

P. E. ANDERSON, *Assistant Examiner.*